Feb. 7, 1933.   W. N. GILBERT   1,896,301
EVEN BALANCE SCALE
Filed July 18, 1928   2 Sheets-Sheet 1
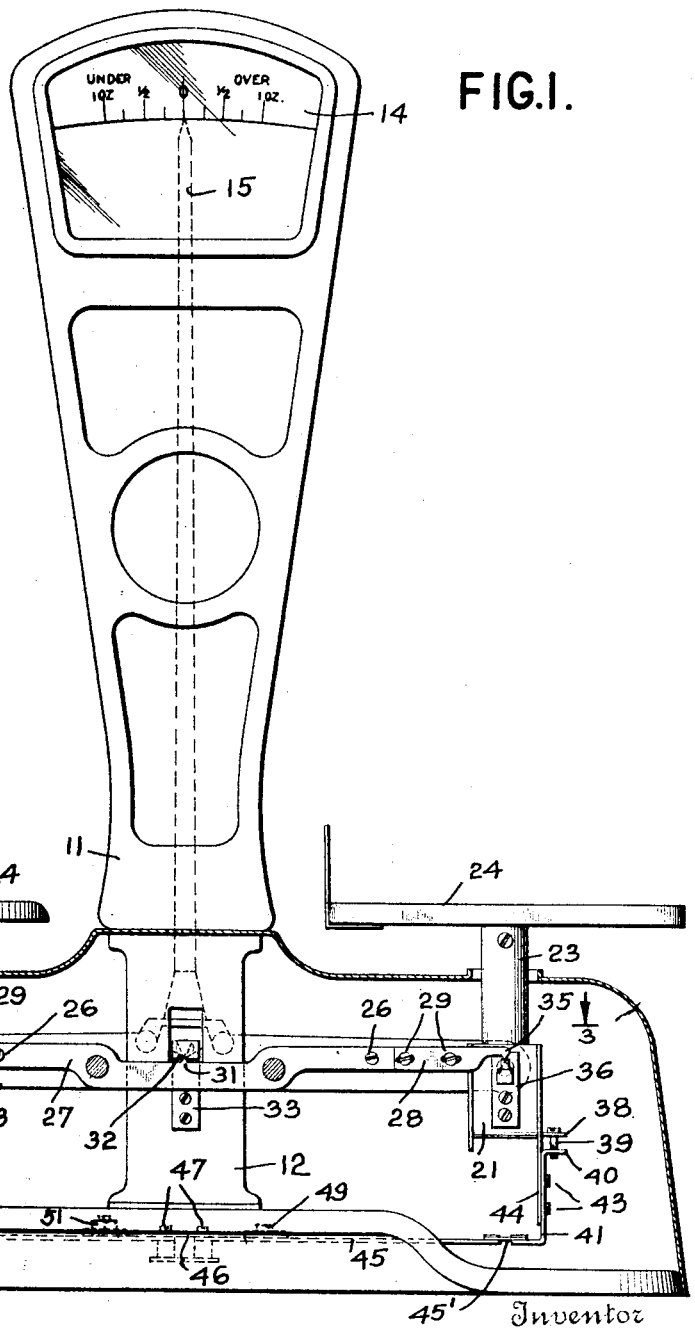

Feb. 7, 1933.  W. N. GILBERT  1,896,301
EVEN BALANCE SCALE
Filed July 18, 1928  2 Sheets-Sheet 2
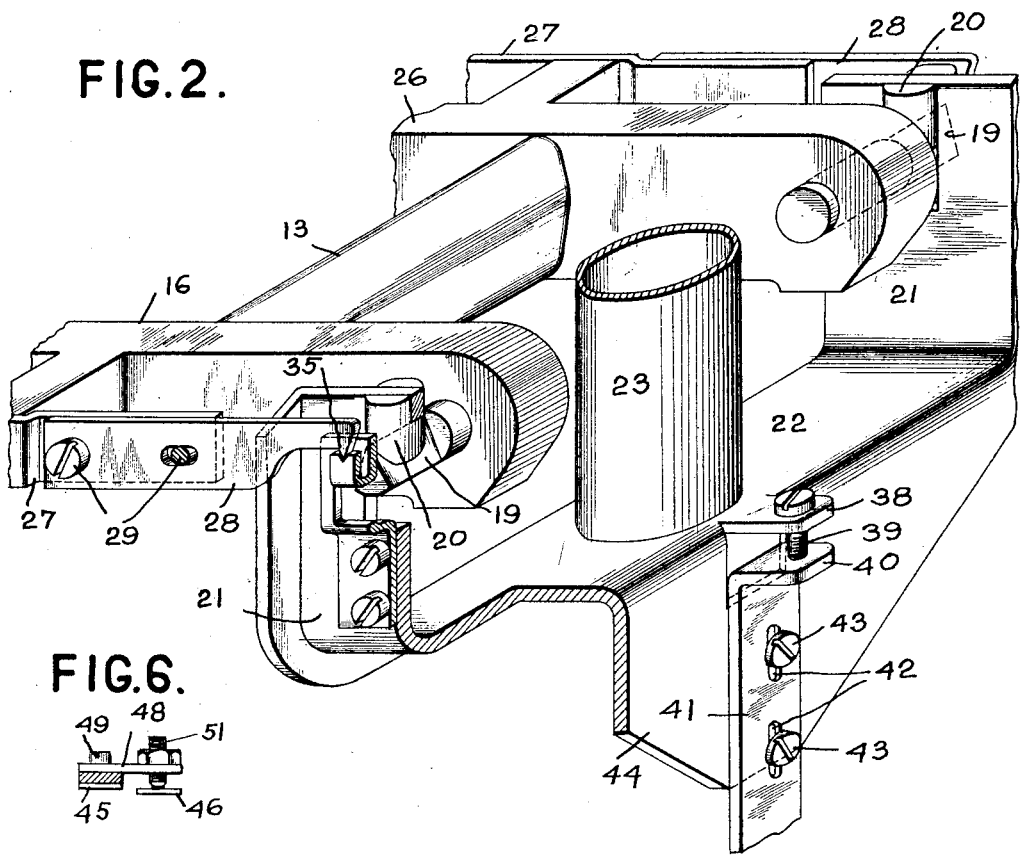
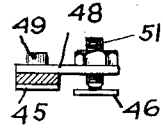
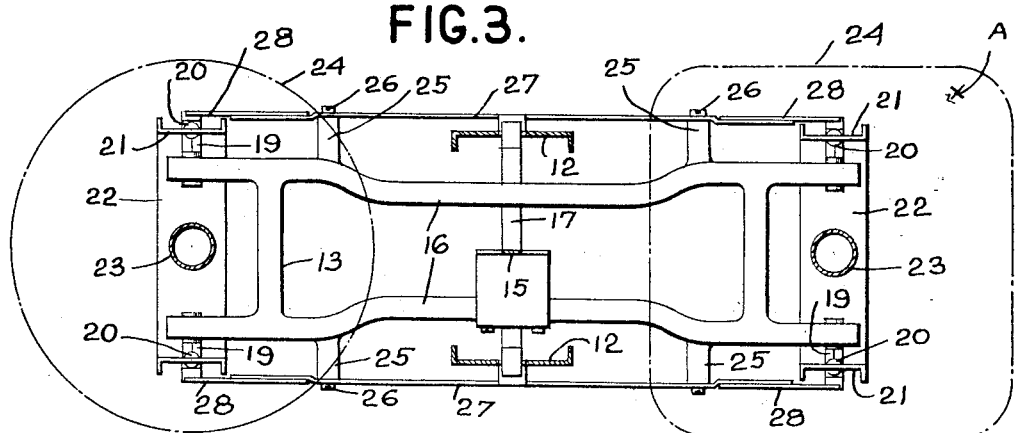
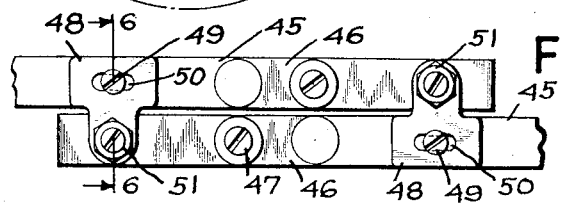

Patented Feb. 7, 1933

1,896,301

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

EVEN BALANCE SCALES

Application filed July 18, 1928. Serial No. 293,635.

This invention relates to weighing scales, particularly of the even balance type.

In such scales, there are a pair of weighing, holding pans usually supported on knife edge bearings on opposite ends of a lever of the first class. When a load is placed to one side of a pan, it tends to tilt the pan laterally of the lever, tilting at the same time, the knife edge bearing members relative to each other. As a result, the bearings fail to make full line contact, and the load instead of being distributed along the entire length of the bearings is concentrated on a small portion thereof. This causes uneven wear of the bearing edges and if the bearings are made of agate, tends to chip them at the edges.

Furthermore, when the load is removed from a tilted pan, the bearing edges come together with a striking action which tends to further chip the bearings. Since the accuracy of the scale depends on the fineness of the knife edges, it is obvious that a scale with uneven and chipped edges will not weigh accurately.

In even balance scales of the type herein dealt with, each pan carries two separate alined spaced bearing members engaging with separate alined knife edges on the scale lever. When a load is placed at one side of a pan, it tends to lift one bearing member completely out of contact with its knife edge and tilt the other bearing member relative to its knife edge. As a result, the bearing edges are apt to chip and wear unevenly for the reasons given above.

The object of this invention is, therefore, to provide means for positively preventing the knife edge bearing members from disengaging or tipping relatively.

Still further, the object of the invention is to provide such means as will prevent tipping or disengagement of the beam knife edges relative to their cooperating scale frame bearing members.

Another object is to provide a novel zero adjustment for the scale.

Still another object is to provide novel adjusting means for positioning the check links relative to the pans, the check links being adapted to prevent tipping of the pans longitudinally of the lever.

Further and other objects and advantages will be hereinafter set forth in the accompanying specification and claims, and shown in the drawings, which by way of illustration show what is now considered to be the preferred embodiment of the invention.

Fig. 1 is a front view of the scale;

Fig. 2 is a detail of the cooperating bearing members of the pan and the lever;

Fig. 3 is a section on line 3—3 of Fig. 1;

Fig. 4 is a detail of the cooperating bearings of the lever and the scale frame;

Fig. 5 is a detail of the zero adjustment means; and

Fig. 6 is a section on line 6—6 of Fig. 5.

Referring to the drawings in detail, the scale comprises a base 10 carrying a housing 11 and vertical frame plates 12 for pivotally supporting the lever 13. The upper portion of the housing 11 is provided with a chart 14 exposed through a window in the housing. Cooperating with the chart is a pointer 15 rigidly mounted on the lever 13. The latter consists of two parallel integrally joined members 16 provided midway of their ends with a single knife edge member 17 (Figs. 3 and 4) which rests in the V-shaped grooves of the agate bearings 18 mounted in the frame plates 12 (Fig. 4). At each end, the lever members 16 are provided with knife edges 19 supporting agate bearings 20 carried by parallel vertical portions 21 of the horizontal plate member 22 on which is rigidly fixed the post 23 carrying the load holding pan 24 (Figs. 1 and 2).

The means for preventing tipping of the pans laterally of the lever will now be described. Each lever member 16 is formed with an outwardly extending lug 25 adjacent each end to which is rigidly fastened by screws 26, a thrust element 27 extending parallel to the lever member. Each element consists of an intermediate portion and two end portions 28 adjustably fastened to the intermediate portion by screws 29 passing through slots 30 in the end portions (Fig. 2). The intermediate portion is provided with a V-shaped upwardly extending lug 31 having a knife edge coacting with a V-shaped groove 32 formed in a member 33 rigidly attached to the frame plate 12 (Fig. 4). The line of contact between the edge of lug 31 and groove 32 is coincident with the line of contact between knife edge 17 of the lever and its cooperating V-shaped agate member 18.

Each end portion 28 of the thrust element terminates in a downwardly extending knife edge 35 resting in a V-shaped groove formed in a member 36 rigidly fastened to the vertical portion 21 of the pan carrying plate 22. The line of contact between edge 35 and the groove in member 36 is coincident with the line of contact between bearing members 20 and 19 of the pan and lever, respectively. To make clear the operation of the thrust elements 27 in preventing tipping of the pans laterally of the beam, assume a load to be placed with its center of gravity at point A on the right hand pan (Fig. 3). Referring to Figs. 2 and 3, it will be observed that the tendency of the pan under the action of the load will be to tilt the pan laterally towards the point A, the center of tilting motion being on the contact line of the bearings 20 and 19 adjacent point A. This will tend to lift the far bearing 20 off the knife edge 19 in addition to providing only a point contact between the adjacent bearings 20 and 19 with the undesirable results hereinbefore outlined. However, far bearing 20 cannot move up because of the resistance of thrust element 28 which has the lug 35 at its end bearing down on the extension 36 of the platform support.

The pan is, therefore, incapable of lateral movement relative to the lever 13 and the only possible motion between them is a relative longitudinal pivotal movement which is freely permitted by the line contact of lug 35 and extension 36. The resistance of the thrust element 27 to the movement of the pan laterally is further aided by the thrust of lug 31 at the center of the element against the frame extension 33. Furthermore, any tendency of the lever to move with the pan laterally is overcome by the thrust against frame extension 33 of the lug 31 furthest away from point A.

If the point A be further towards the center and between the pair of bearings 20 or 19, there will still be a tendency of the pan to tilt laterally of the lever, the flexible check strip 45′ to be referred to more fully hereinafter bending laterally towards the point A. This tendency to tilt will be overcome completely by thrust elements 27, in the manner above described.

To prevent tipping of the pans longitudinally, the following check construction is used. Each plate 22 is formed with a projecting lug 38 (Fig. 2) carrying a screw 39 threaded into a lug 40 parallel to lug 38. The lug 40 is integral with a vertical bar 41 having slots 42 through which freely pass the shank of screw lugs 43 carried by a vertically bent portion 44 of the pan supporting plate 22. The bar 41 at its lower end is bent horizontally in a direction opposite to which lug 40 extends. Fastened to the end of said lower horizontal portion is a thin flexible strip 45′ connected to one end of a bar 45 (Figs. 1 and 5). The other end of the bar 45 is connected to a thin flexible strip 46 by rivets or the like in the same manner as bar 45 is connected at the opposite end to strip 45′. Each strip 46 is attached to the base 10 intermediate its length by screws 47. The bar 45 and the portion of strip 46 extending therefrom to screw 47 move together as a check link. This portion of strip 46 will be termed "check strip 46" hereinafter. The other portion of strip 46 extending outwardly and freely from screw 47 is not affected by movement of the check strip 46 associated therewith but is equivalent to a separate spring strip secured at one end to the base at 47 and extending freely from the securing point. This portion of strip 46 will be termed hereinafter "free strip 46". The bar 45 and strip 46 of one platform check structure extends side by side with the bar 45 and strip 46 of the other platform check structure (see Fig. 5). A lug 48 is fastened to each bar 45 by means of a screw 49 threaded into the bar and passing through an elongated slot 50 in the lug. The lug projects over the spring strip 46 (see Fig. 6) of the other check link structure and is provided with a screw 51 threaded into the lug and bearing on the surface of the spring strip.

The latter presses up on the screw 51 and thus tends to lift the bar 45 at the side thereof to which the lug 48 is attached. The tendency of the bar 45 to move upwardly is resisted by the weight of the platform structures. It is apparent that by increasing or decreasing this tendency of either bar 45, the upward force exerted on the platform structures will similarly increase or decrease. The pointer 15 attached to lever 13 associated with the platform structures, may thus be moved slightly in either direction by increasing or decreasing the tendency of the bar 45 to move upwardly. Thus if it is desired to move the pointer to the right in order that it indicate zero on the chart, the left hand lug 48 (as viewed in Fig. 5) is first shifted to the right along the bar 45. This provides a rough adjustment as the spring pressure of the free strip 46 on screw 51 increases slightly as the screw approaches the point of attachment of the strip at 47. In order to provide the finer zero adjustment, the screw 51 is then turned in a direction to move it down and as a result the pressure of strip 46 thereon increases. The resultant increase of pressure on screw 51 is transmitted as an upward push on the left hand bar 45 which through the decreased pull on the left hand platform, causes the lever 13 to rock clockwise slightly and moves the pointer thereon to the right. The same result can be obtained by decreasing the pressure of the right hand screw 51 on the spring strip 46 of the opposite check linkage.

In order to provide a true vertical movement of the platforms during weighing, it is necessary that lever 13, check links 45 and platform supports 21 form an exact parallelogram. This is obtained by adjustment of screws 39 to move bars 41 until the check strips 45 are exactly the same distance from the platform and lever fulcrums 20 and 19 as the end strips 46 at their attachments to the base are from the lever and housing fulcrums 17 and 18.

The tendency of the pans to tip longitudinally of the lever when a load is placed on an end thereof is overcome by the resistance of the bar 45, strip 45' and check strip 46 to longitudinal movement. In addition, the check linkages serve as spring counterbalances to permit weighing of small amounts of over and under. This counterbalancing action is provided by the flexible strips 45' and check 46 of a check linkage combined with the action of the end of the free strip 46 of a check linkage in pressing upwardly on the screw 51 associated with the bar 45 of the other check linkage.

The usual dash pot 52 is connected to an extension 53 of the lever 13 (see Fig. 1).

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims:

I claim:

1. A scale comprising a load support, a check link associated therewith to prevent tipping thereof, said check link having a counterbalancing effect on said load support, and means for varying said counterbalancing effect.

2. A scale comprising a pan, a check link associated therewith to prevent tipping thereof, and means engaging said check link to adjust its position relative to said pan.

3. A scale comprising a load support, a check link associated therewith, and counterbalancing means adjustably engaging one end of said check link.

4. A scale comprising a load support, a check link associated therewith, and counterbalancing means engaging said check link, said counterbalancing means being adjustable in a plurality of different ways relative to said check link.

5. A scale comprising load supports mounted on opposite ends of a lever, a check linkage connected to each load support, and means for adjusting the heights of said linkages relatively to the load supports and lever.

6. A scale comprising a platform, a support therefor, a check link, and an adjustable threaded connection between said link and support.

7. A scale comprising a pair of load supports mounted on opposite ends of a lever, a check linkage connected to each load support, and means on one check linkage exerting pressure vertically on the other check linkage.

8. A scale comprising load supports mounted on opposite ends of a lever, a check linkage connected to each load support, said check links including spring portions, and means for causing the spring portion on one check linkage to exert a force on the other check linkage.

9. A scale comprising a load support, a check linkage associated therewith, and means exerting pressure vertically on said linkage, said means being adjustable in one way to provide a rough adjustment of the pressure exerted thereby and being adjustable in a different way to provide a fine adjustment of the pressure exerted thereby.

10. A scale comprising an even balance beam, indicating means for indicating the deflection of the beam to either side of its no load position, a member adjustably connected to said beam, and a spring strip exerting pressure on said adjustable member to coordinate the movement of the beam to the indicating means, said spring strip lying in a horizontal plane parallel to the beam when the latter is in no-load position.

11. A scale comprising a platform, a check linkage associated therewith, a member adjustably connected to said linkage, and means for exerting pressure on said member.

12. A scale comprising a platform, a check element associated therewith, a member mounted on said element, and a spring element adjustably acting on said member.

13. A scale including a platform, a lever associated therewith, a member adjustably attached to said lever, a spring resistant device for exerting pressure on said member and means for varying said pressure.

14. A scale including a lever provided with a bearing member, a platform structure having a bearing member coacting with said first-named member to pivotally support the platform structure on the lever, and adjustably mounted means engaging said platform structure to prevent said bearing members from separating.

15. A scale including a lever provided with a bearing member, a platform structure provided with a bearing member cooperating with the other bearing member to fulcrum said structure on said lever, and means adjustably mounted on said lever engaging said platform structure to prevent relative lateral tilting movement of said bearing members.

16. A scale including a lever member carrying a bearing element and a thrust element and a platform member carrying a bearing element and a thrust element, said bearing elements coacting to fulcrum the platform member on the lever member and said thrust elements coacting to prevent separation of said bearing elements, one of said thrust elements being adjustably mounted on its carrying member.

17. A scale including a frame, a lever, a platform structure fulcrumed on said lever, and a thrust element engaging said platform structure and said frame to prevent separation of the platform from the lever at its fulcrum point.

18. A scale including a frame, a lever fulcrumed thereon, a pair of platform structures fulcrumed on opposite ends of said lever, and a thrust element fixed to said lever and engaging both said platform structures and said frame to prevent separation of the platform structures from the lever at their fulcrum points.

19. In a scale, a frame, a beam, load offsetting means comprising a flat spring anchored to said frame, means interassociating said beam to said load offsetting means including an element coacting with said spring and adjustable at will thereto to adjust the counterbalancing effect of said means, and an indicator mounted separately from the flat spring operable upon movement of the beam to indicate the deflection of the beam.

20. In a scale, a beam, a flat counterbalancing spring having a free end, means for associating said beam and said free end of said spring including an element adjustable relative to said spring in a plurality of different ways to adjust the counterbalancing effect of said spring.

21. In a scale, a frame, an even balance beam pivoted thereon, a flat counterbalancing spring anchored to said frame at a point substantially in line with the beam pivot and having a free end and associating means between said beam and said free end of the spring including an element free of the counterbalancing force of the spring when the beam is in balance and affected by the spring only when the beam is out of balance.

22. In a scale, an even balance beam, a counterbalancing means of the flat straight spring type, and devices between said means and said beam including a pair of members on opposite sides of the beam pivot, each acting on said counterbalancing means to oppose movement of said beam, and means for adjusting said members relative to said means to vary the counterbalancing effect of the latter.

23. A scale comprising a lever, a pair of load pans supported by opposite ends of the lever, a member connected to said lever, a flat spring extending in the same direction as said lever and acting on said member to hold the lever in no-load position, under-and-over indicating means for indicating the position of the lever, and means for adjusting the spring and member relatively in a direction longitudinally of the lever to coordinate the movements of the lever to the indicating means.

24. A scale comprising a lever, an indicating element actuated thereby and positioned between the ends of the lever, a pair of load pans supported by opposite ends of the lever, a flat spring extending in the same direction as said lever and associated therewith to hold it in no-load position, and indicating means stationarily carried for cooperating with the indicating element to indicate the movement of the lever in either direction from no-load position, said spring and lever being relatively adjustable to coordinate the movements of the lever with the indicating means.

25. A scale comprising a lever, a pair of load pans supported by opposite ends of the lever, a flat spring extending in the same direction as the lever, a frame to which one end of the spring is connected, and provided with a graduated chart above the lever, means for associating the other end of the spring to the lever, the spring tending to hold the lever in no-load position, indicating means operated by the lever and supported intermediate the ends of the lever for cooperating with the chart to indicate movement of the beam in either direction from a no-load position, and means for adjusting said spring to coordinate the movements of the lever to the indicating means.

26. A scale comprising a pivoted lever, a pair of load pans supported by opposite ends of the lever, a flat spring extending in the direction of the lever, a frame to which the spring is connected at a point substantially in line with the pivot of the lever, and interassociating means between the spring and the lever influenced by the spring only when the beam moves from no-load position.

27. A scale comprising a pivoted lever, a pair of load pans supported by opposite ends of the lever, a flat spring extending parallel to the lever, a frame having a projecting lug with a substantially horizontal surface to which one end of said spring is attached, and a device extending between the lever and the spring for flexing the latter upon movement of the lever, indicating means for indicating the movement of the lever from no-load position, and means cooperating with the spring for coordinating the movement of the lever to the indicating means.

28. A scale comprising an even balance beam, indicating means for indicating deflection of the beam to either side of its normal position, a member connected to said beam, and a horizontal spring strip engaging said member and relative to which the member is horizontally adjustable to adjustably resist movement of the beam.

29. A scale comprising an even balance beam, a member adjustably connected to said beam, a spring strip engaging said member to resist movement of the beam from no-load position, and an indicator operatively connected to the beam independently of the spring strip to indicate movement of the beam.

30. A scale comprising an even balance beam, an indicator to indicate deflection of the beam from normal position, and a pair of spring strips, each operated by a different arm of the beam to resist deflection of the beam from normal position.

31. A scale comprising an even balance beam, indicating means to indicate deflection of the beam to either side of a neutral position, a spring resistance, and a device intermediate the beam and resistance for operating the latter to resist movement of the beam, the device including a part directly coacting with the resistance, said resistance and said part being relatively horizontally adjustable to vary the resistant force exerted by the spring to movement of the beam throughout its range for coordinating movement of the beam with the indicating means.

32. A scale comprising a rockingly mounted beam, indicating means for indicating deflection of the beam to either side of a neutral position, a spring resistance, a device operated by the beam for actuating the spring resistance to cause the latter to resist movement of the beam, said device having a part relative to which said resistance is adjustable in a horizontal direction to vary the resistant force exerted by the spring to movement of the beam throughout its range, said part of the device and resistance being also relatively vertically adjustable to properly initially position them relatively.

33. A scale comprising a rockingly mounted beam, under and over registering means including a chart and pointer one of which is secured to the beam, a spring resistance, means for operating said resistance to resist movement of the beam in only one direction from a neutral position, and means for adjusting said resistance to vary the counterbalancing effect thereof to coordinate registrations of the chart and pointer to the actuating load on the beam.

34. A scale comprising an even balance beam, an indicator to indicate deflection of the beam from a neutral position, a pair of spring resistances, means for operating one resistance to independently of the other resistance resist deflection of the beam in one direction only from neutral, other means for operating the other resistance to independently resist deflection of the beam only in the opposite direction from neutral, and means for separately and individually adjusting the counterbalancing effect of each of said resistances to coordinate movements of the indicator to the actuating load on the beam.

35. A scale comprising an even balance beam, an indicator to indicate deflection of the beam from a neutral position, a plurality of spring resistances, means for operating said resistances one at a time and independently of each other to resist opposite movements of the beam, and means for separately and individually adjusting the counterbalancing effect of each of said resistances.

In testimony whereof I hereto affix my signature.

WILLIAM N. GILBERT.